United States Patent
Lau

(10) Patent No.: US 6,858,955 B2
(45) Date of Patent: Feb. 22, 2005

(54) END CAP ASSEMBLY

(75) Inventor: James Ching Sik Lau, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 169 days.

(21) Appl. No.: 09/933,008

(22) Filed: Aug. 21, 2001

(65) Prior Publication Data

US 2002/0047471 A1 Apr. 25, 2002

(30) Foreign Application Priority Data

Aug. 21, 2000 (GB) ................................................ 0020519

(51) Int. Cl.$^7$ .......................... H02K 5/24; H02K 11/00; H02K 5/00; H02K 13/00; H01R 39/38
(52) U.S. Cl. .......................... 310/51; 310/71; 310/89; 310/239
(58) Field of Search ........................... 310/239, 71, 89, 310/88 C, 68 B, 68 R, 40 MM

(56) References Cited

U.S. PATENT DOCUMENTS

| | | | | |
|---|---|---|---|---|
| 4,845,393 A | * | 7/1989 | Burgess et al. | 310/51 |
| 4,853,576 A | * | 8/1989 | Mayumi et al. | 310/239 |
| 4,874,337 A | * | 10/1989 | Paukovits et al. | 439/609 |
| 5,196,750 A | | 3/1993 | Strobl | |
| 5,281,876 A | * | 1/1994 | Sato | 310/40 MM |
| 5,313,126 A | * | 5/1994 | Forsythe et al. | 310/51 |
| 5,345,124 A | | 9/1994 | Lang | |
| 5,360,353 A | | 11/1994 | Kinoshita | 439/620 |
| 5,610,467 A | * | 3/1997 | Shiah et al. | 310/239 |
| 5,780,952 A | * | 7/1998 | Lau | 310/239 |
| 5,905,627 A | * | 5/1999 | Brendel et al. | 361/302 |
| 5,973,906 A | * | 10/1999 | Stevenson et al. | 361/302 |
| 6,008,980 A | * | 12/1999 | Stevenson et al. | 361/302 |
| 6,232,684 B1 | * | 5/2001 | Haag et al. | 310/68 R |
| 6,400,058 B1 | * | 6/2002 | Liau | 310/239 |
| 6,529,103 B1 | * | 3/2003 | Brendel et al. | 333/182 |

FOREIGN PATENT DOCUMENTS

| | | | |
|---|---|---|---|
| EP | 0607032 | | 7/1994 |
| EP | 0638968 | | 2/1995 |
| GB | 2298524 | | 9/1996 |
| JP | 61085052 | | 4/1986 |
| JP | 407107709 A | * | 4/1995 |
| JP | 411262171 A | * | 9/1999 |
| JP | 2000-023434 A | | 1/2000 |
| JP | 2000252018 A | * | 9/2000 |

* cited by examiner

*Primary Examiner*—Tran Nguyen
*Assistant Examiner*—Julio Gonzalez
(74) *Attorney, Agent, or Firm*—Birch, Stewart, Kolasch & Birch, LLP

(57) ABSTRACT

An end cap assembly 20 for an electric motor has an insulating body 22 and a conductive cover 24. The cover 24 supports a bearing for a shaft of the motor. The body 22 supports brushes and motor terminals. An EMI device 36 is electrically connected across the motor terminals and is earthed to the cover by way of resilient contacts.

13 Claims, 4 Drawing Sheets

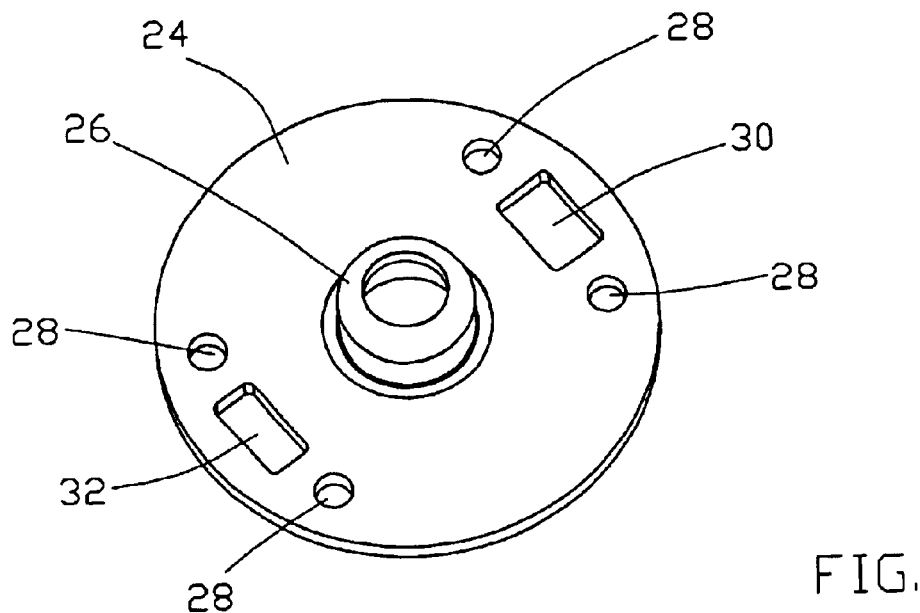
FIG. 3
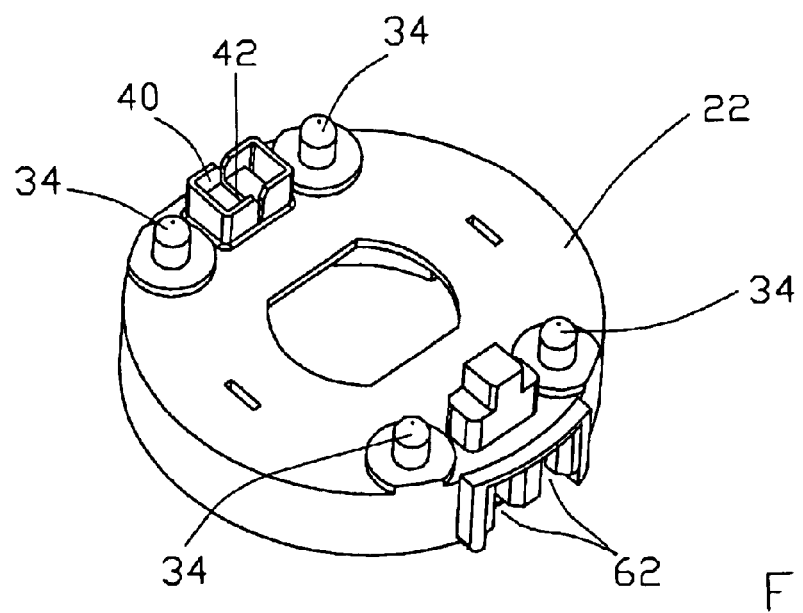
FIG. 4
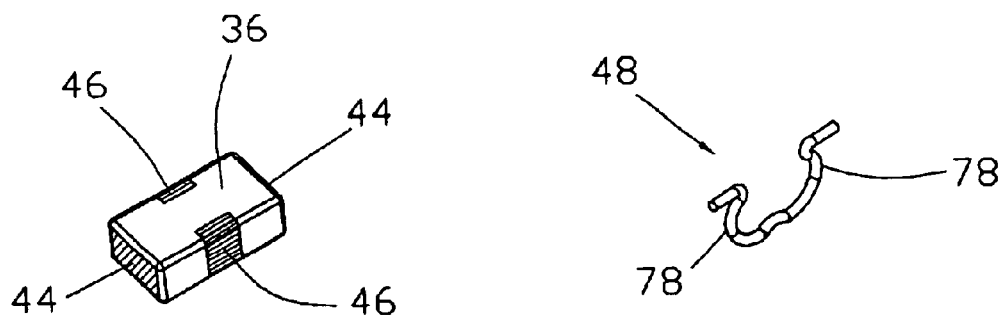
FIG. 5
FIG. 6

END CAP ASSEMBLY

This invention relates to an electric motor and in particular, to motors with improved EMI characteristics.

In many applications an electric motor is required which has low EMI emissions. In the past, this has been achieved by shielding the electric motor as much as possible and/or by adding EMI or noise suppression components such as chokes, capacitors and diodes into the motor circuitry, usually within the motor itself mounted on the end cap or even directly on the rotor.

These measures have had limited success but there has always been a trade off between cost and performance. As EMI requirements are becoming more strict, better EMI suppression is required.

Thus, there is a need for a miniature PMDC motor with reduced EMI emissions.

The present invention provides such a motor by incorporating a chip type EMI filter circuit into the circuitry of the motor.

Accordingly, the present invention provides an end cap for a miniature electric motor, the end cap having a body of insulating material and a cover of conductive material, wherein the body supports two brushes for making sliding contact with a commutator, two motor terminals for connecting a power supply to the brushes and a chip type EMI device having at least three terminals including: two input terminals, respectively connected to the two motor terminals; and at least one earth terminal electrically connected to the conductive cover.

Preferably, the chip type EMI device has two earth terminals which are connected to the conductive cover.

Preferably, the cover has an opening in which the EMI device is located and the conductive spring engages an edge of the opening to establish electrical contact between the or each earth terminal of the EMI device and the cover.

Preferably, the device is located in a compartment integrally formed in the body and is retained in the compartment by the conductive spring.

One preferred embodiment of the present invention will now be described, by way of example only, in which:

FIG. 3 is a perspective view of a cover being a part of the end cap of FIG. 1;

FIG. 4 is a perspective view of a body of the end cap of FIG. 1;

FIG. 5 depicts an EMI device as used in FIG. 1;

FIG. 6 depicts an earth spring as used in FIG. 1;

Figure 1:
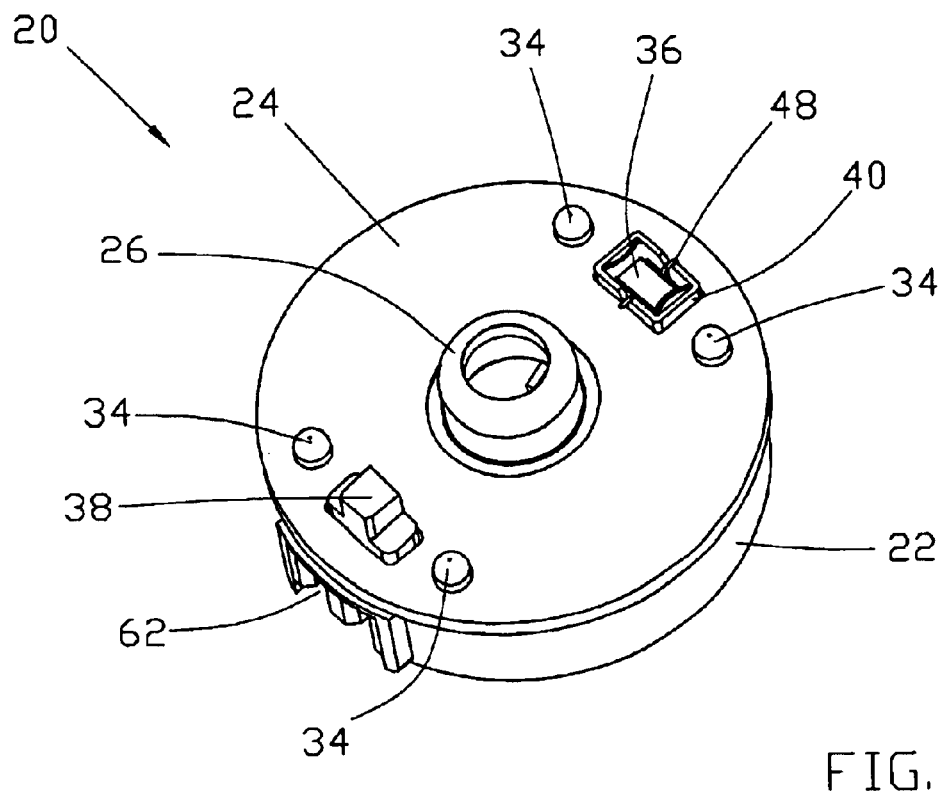
FIG. 1 is a perspective view of an end cap according to the preferred embodiment of the present invention.
Figure 2:
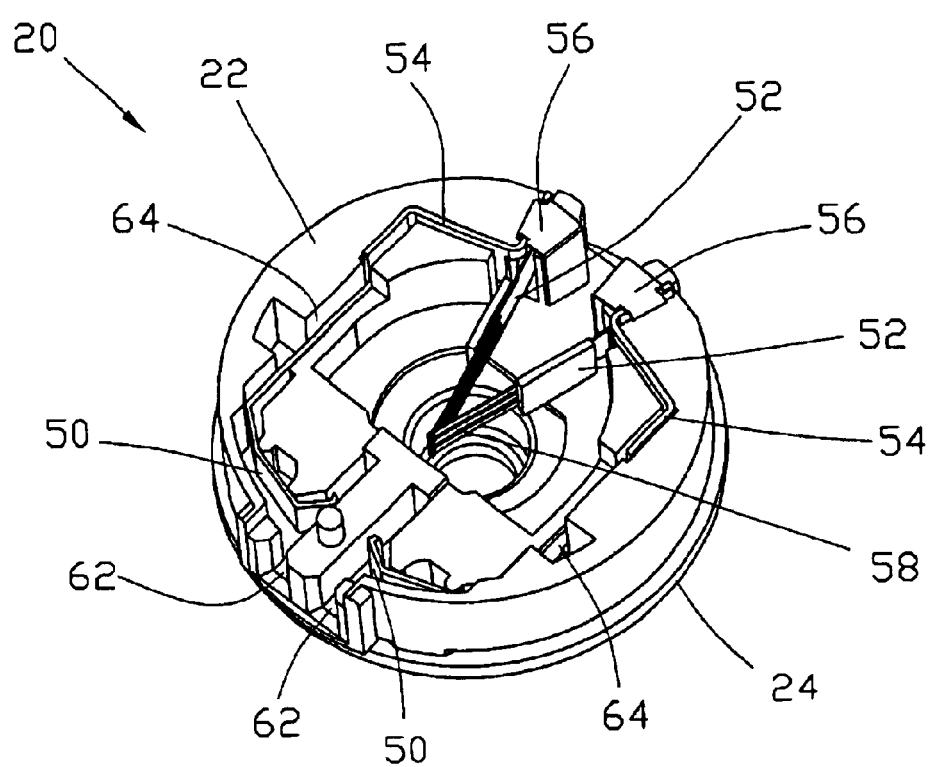
FIG. 2 is an inside perspective view of the end cap of FIG. 1.

The preferred end cap 20 is shown in FIGS. 1 and 2, FIG. 1 being a plan view or outside view and FIG. 2 being a view from below or an inside view as this side of the end cap is covered in use by a motor housing. The end cap has a body 22 of insulating material and is preferably a plastics injection molded part. The outer side of the end cap is covered by a conductive cover 24 which is pressed from sheet metal. The cover has a central boss 26 forming a retainer for a bearing for a rotor shaft.

As shown in FIG. 3, the cover 24 has four round holes 28 and two rectangular holes 30, 32. The four round holes 28 receive fixing posts 34 formed on the body 22 for fixing the cover 24 to the body by a staking process. One of the rectangular holes 30 accommodates the EMI device 36 while the other 32 receives a projection 38 formed on the body. The posts 34 and projection 38 are more clearly shown in FIG. 4. FIG. 4 also shows an integral compartment 40 formed on the upper surface of the body for receiving the EMI device. The compartment 40 is divided into halves by a slot 42.

The EMI device is shown in FIG. 5. It is a chip type device being a small rectangular prism with input terminals 44 at each axial end and two earth terminals 46 midway between the axial ends, one on each of the narrower side faces. The preferred EMI device is a four terminal layered architecture noise canceling chip device. An earth connector 48 in the form of a W-shaped conductive wire spring, as shown in FIG. 6, connects both earth terminals 46 to the cover 24.

Figure 7:
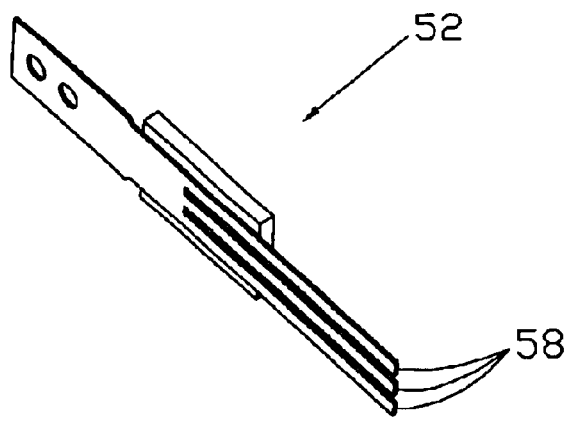
FIG. 7 depicts a brush leaf as shown in FIG. 2.

The body 22 supports the electrical components of the end cap. FIG. 2 shows the body supporting motor terminals 50, fingerleaf brushes 52, brush holders 54 and spring connectors 56. The fingerleaf brushes 52 (FIG. 7) are strips of a resiliently flexible conductive material such as beryllium copper. The distal end of the brush leaf has been separated into three fingers 58, forming a co-called fingerleaf brush. Each brush 52 is connected, by upset rivets 60, to a brush holder 54 which fixes the brush 52 to the body 22. Motor terminals 50 extend from apertures in the body along grooves 64 to make resilient contact with the brush holders 54. While female motor terminals are shown, male terminals are also possible.

Figure 8:
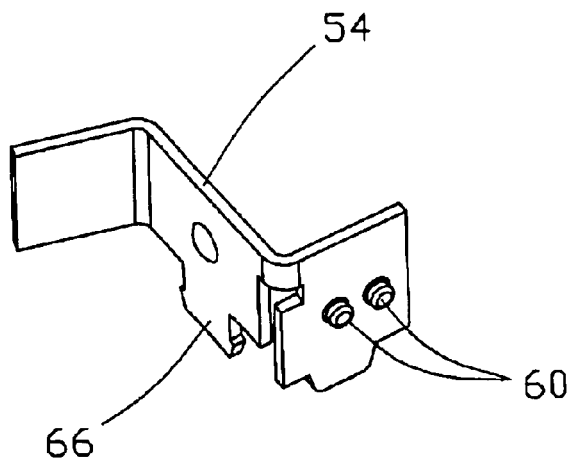
FIG. 8 depicts a brush holder as shown in FIG. 2.
Figure 9:
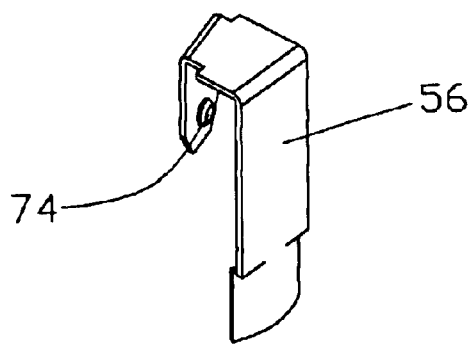
FIG. 9 depicts a spring connector as shown in FIG. 2.

The brush holders 54, more clearly shown in FIG. 8, have a barb 66 which is pressed into a slot 68 in the body for fixing the brush holder in position and hence, the brushes. The spring connectors 56 make resilient contact with the respective brush holders and extend through apertures 70 in the body into opposite ends of the compartment 40 for the EMI device 36. The spring connectors 56 (FIG. 9) are of conductive spring material such as brass and the distal ends are arranged to make resilient electrical contact with the terminals 44 of the EMI device 36 while accommodating variations in size between individual EMI devices due to manufacturing tolerances.

Figure 10:
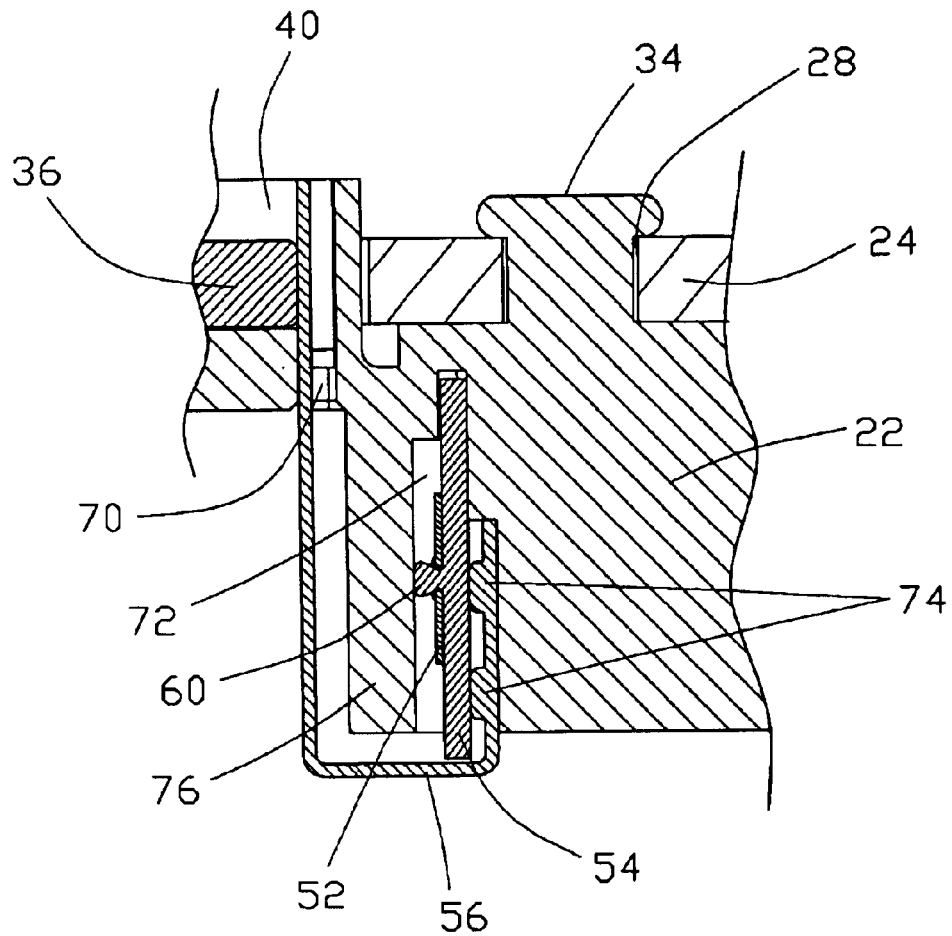
FIG. 10 is a detail view of the connection of the brush holder with the spring connector of FIG. 2.

FIG. 10 shows in detail the arrangement of a spring connector 56. The brush leaf 52 is fixed to the brush holder 54 by upset rivets 60 and the join is located in a slot 72 in the body. The spring connector has a 'U'-shaped end which is pressed into the slot 72 with the brush holder 54 and the brush leaf 52. The end has dimples 74 for making better contact with the brush holder 54. The spring connector 56 thus straddles the respective brush holder 54, brush leaf 52 and a wall 76 of the body 22 with the other end extending through the body and into the compartment 40 for the EMI device 36 located on the other side of the body 22.

Figure 11:
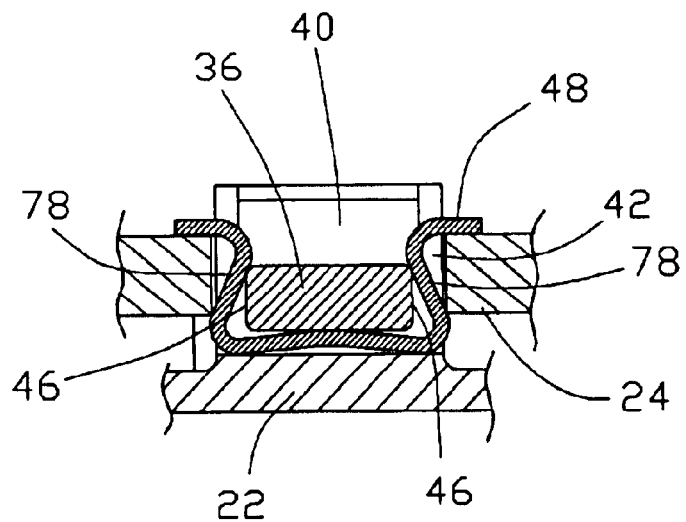
FIG. 11 is a detail view of the assembly of the earth spring of FIG. 6.

FIG. 11 illustrates in detail the earth connection. The EMI device has two earth terminals 46 located midway along the narrower sides. The earth spring 48, which is similar to a 'W' in shape is located in the slot 42 in walls of the compartment 40 thus locating the earth spring 48 axially along the length of the EMI device 36. The outer legs 78 of the spring press against inner edges of the rectangular hole 30 in the cover 24 while the outer legs 78 also resiliently bear against the earth terminals 46 of the EMI device 36.

Although only one preferred embodiment has been described, variations will be apparent to those skilled in the art and it is intended to cover all such variations as fall within the scope of the appended claims.

What is claimed is:

1. An end cap for a miniature electric motor, the end cap having a body of insulating material and a cover of conductive material, wherein the body supports two brushes for making sliding contact with a commutator, two motor terminals for connecting a power supply to the brushes and an electro-magnetic interference chip device having at least three terminals including: two input terminals, respectively connected to the two motor terminals; and at least one earth terminal electrically connected to the conductive cover.

2. The end cap of claim 1, wherein the electro-magnetic interference chip device has two earth terminals which are connected to the conductive cover.

3. The end cap of claim 1, wherein the at least one earth terminal of the electro-magnetic interference chip device is connected to the conductive cover by a conductive spring.

4. The end cap of claim 3, wherein the electro-magnetic interference chip device has two earth terminals and the conductive spring is 'W'-shaped.

5. The end cap of claim 3, wherein the cover has an opening in which the electro-magnetic interference chip device is located and the conductive spring engages an edge of the opening to establish electrical contact between the at least one earth terminal of the electro-magnetic interference chip device and the cover.

6. The end cap of claim 3, wherein the device is located in a compartment integrally formed in the body of the end cap and is retained in the compartment by the conductive spring.

7. The end cap of claim 1, wherein the body of the end cap has an integrally formed compartment in which the electro-magnetic interference chip device is located.

8. The end cap of claim 1, wherein the electro-magnetic interference chip device is held between a pair of resiliently deformed electrically conductive connectors.

9. The end cap of claim 8, wherein the connectors are spring connectors which make resilient contact with the input terminals of the electro-magnetic interference chip device.

10. The end cap of claim 8, wherein the brushes comprise resiliently flexible conductive strips connected to relatively rigid brush holders and the spring connectors are electrically connected to the motor terminals by way of the brush holders.

11. The end cap of claim 10, wherein the brushes each have a free end divided into a plurality of fingers adapted to make sliding contact with the commutator.

12. The end cap of claim 10, wherein the brushes include a carbon based body fitted to an end of the strip for making sliding contact with the commutator.

13. The end cap of claim 1, wherein the electro-magnetic interference chip device is mounted on the body of the end cap and is accessible from an outer surface of the end cap.

* * * * *